United States Patent [19]
Walne

[11] Patent Number: 5,581,450
[45] Date of Patent: Dec. 3, 1996

[54] FEEDBACK CONTROL LOOP IN A POWER SUPPLY CIRCUIT

[75] Inventor: Michael Walne, Wetherby, England

[73] Assignee: Advance Power Limited, West Yorkshire, England

[21] Appl. No.: 234,266

[22] Filed: Apr. 28, 1994

[30] Foreign Application Priority Data

May 1, 1993 [GB] United Kingdom .................. 9309088

[51] Int. Cl.⁶ .......................... H02M 3/335; G05F 1/656
[52] U.S. Cl. ............................................. 363/21; 323/222
[58] Field of Search ................................. 363/19, 21, 23, 363/25; 323/222, 282

[56] References Cited

U.S. PATENT DOCUMENTS

| | | | |
|---|---|---|---|
| 4,013,939 | 3/1977 | Biess et al. .................... | 323/20 |
| 4,603,288 | 7/1986 | Rogers ............................ | 323/234 |
| 4,956,761 | 9/1990 | Higashi ........................... | 363/19 |
| 5,267,133 | 11/1993 | Motomura et al. ............. | 363/21 |
| 5,408,402 | 4/1995 | Nonnenmacher ............... | 363/21 |
| 5,434,485 | 7/1995 | Kawashima et al. ........... | 315/382.1 |
| 5,440,473 | 8/1995 | Ishii et al. ....................... | 363/21 |

FOREIGN PATENT DOCUMENTS 0473925  11/1992  European Pat. Off. ....... H02M 3/156

*Primary Examiner*—Matthew V. Nguyen
*Attorney, Agent, or Firm*—Woodard, Emhardt, Naughton, Moriarty & McNett

[57] ABSTRACT

A feedback loop in a power supply operating in a switched mode has a dual response controller which provides slow response to superimposed ripple on the power supply output by two impedances in series, and when there is transient deviation on the output diode, switching brings in a further impedance in parallel with one of the two impedances to reduce the overall impedance and provide a faster response for the control of the switching mode.

15 Claims, 2 Drawing Sheets

FEEDBACK CONTROL LOOP IN A POWER SUPPLY CIRCUIT

TECHNICAL FIELD OF THE INVENTION

This invention relates to feedback control loop circuits and relates particularly but not exclusivley to off line switched mode power supplies.

BACKGROUND OF THE INVENTION

An example of a switched mode power supply is set forth in U.S. Pat. No. 5,166,871 wherein a pulse width modulating circuit is used and a first feedback means responsive to the load voltage controls the duty cycle of the pulse width modulator, the first feedback means having a relatively long time constant so that changes in the load current are not rapidly reflected in the input circuit.

A second feedback means responsive to load voltage level is also provided and this in its turn provides an analogue control signal which varies the pulse width of the signal from the pulse width modulator, and the second feedback means has a relatively short time constant so that the load voltage is more tightly regulated in instances where the load voltage rises above a predetermined level.

The present invention, at least in its preferred form, seeks to provide an improved feedback control loop circuit such as a switched mode power supply circuit which, as compared to the arrangement described in said U.S. Patent, (i) provides upper and lower limits at which the faster response for load voltage regulation is effective; (ii) has a single reference voltage to determine said upper and lower limits and (iii) uses operational amplifiers, in the preferred embodiment of the invention, which remain in a linear control range under normal operating conditions.

It is also known to provide a feedback control loop circuit provided in a power supply circuit operating in switched mode via a switching element driven by a pulse width modulator, wherein the modulator demand signal is derived from a voltage error sensing circuit which compares a fraction of the voltage of an output storage capacitor with a reference voltage and the output is fed to a notch filter. The problem with the use of a notch filter is that it is useful only at a unique frequency, but power supplies are often required to operate world wide without modification and line frequency can be different from country to country. The present invention in its preferred form overcomes this problem.

SUMMARY OF THE INVENTION

According to the present invention there is provided in a power supply circuit comprising an input and an output and a feedback control loop for improving the quality of the input current waveform dependent upon conditions at the output, and wherein the output is susceptible to undesireable superimposed ripple in steady state condition and transient deviations from said steady state conditions:

The improvement that in the feedback control loop there is provided an impedance circuit comprising a parallel combination of first and second impedances, and a third impedance in series with said parallel combination, and a switching means isolating the first impedance under steady state conditions so that the impedance circuit provides high attenuation to said ripple, and in transient deviations switches in the first impedance so that the impedance circuit provides a faster response than when the first impedance is isolated.

Preferably, said switching means includes bi-directional switches which are respectively operated depending upon the direction of deviation of the transient from the steady state condition.

Preferably also, said switches comprise oppositely biased diodes.

By this means, when the output voltage deviates beyond normal steady state ripple conditions, one or other of the diodes, depending upon the direction of deviation, becomes conductive and the influence of an impedence connected in series with them produces a much faster pulse width modulator demand signal response.

The said impedances my be arranged to provide different pulse width modulator demand response signals depending upon the direction of deviation of the output from normal steady state ripple conditions.

It can be seen therefore that the invention provides a feedback control loop circuit, especially in a switched mode power supply, wherein the input current wave form is improved by a pulse width modulation controlled boost convertor, which provides rapid response beyond normal upper and lower limits of ripple voltage and only a single reference voltage is needed to determine the response thresholds; the operational amplifier can remain in the linear control range under normal operating conditions.

BRIEF DESCRIPTION OF THE DRAWINGS

Embodiments of the invention will now be described by way of example, with reference to the accompanying drawings, wherein.

DESCRIPTION OF THE PREFERRED EMBODIMENTS

Figure 1:
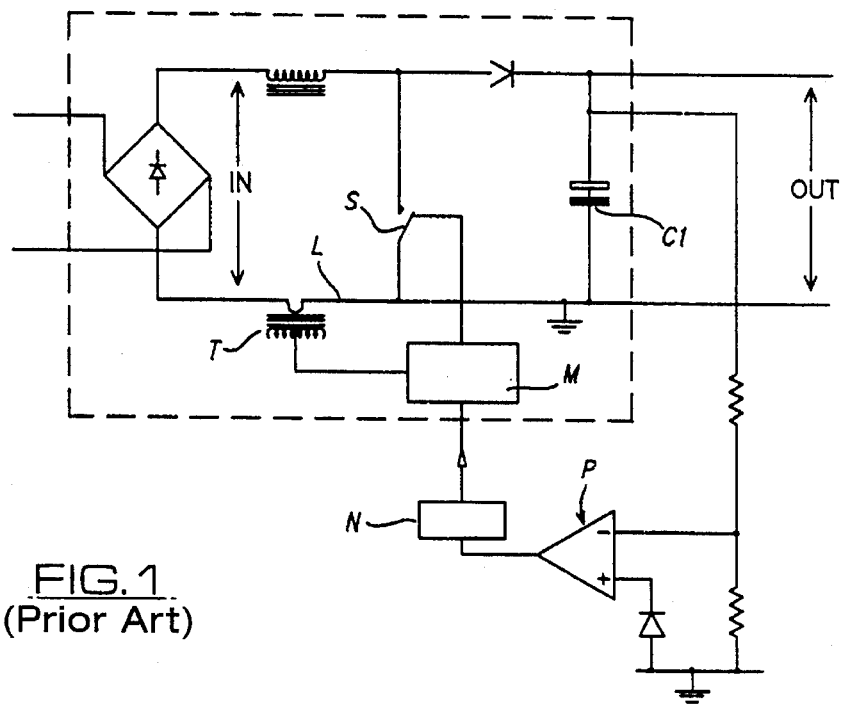
FIG. 1 is a circuit of a conventional off line switched mode power supply.

Referring to the drawings in FIG. 1 a switched mode power supply of known configuration having an input IN and an output OUT is shown. This supply operates according to known principles not set forth herein but outlined in U.S. Pat. No. 5,166,681 to which reference is made. The circuit includes a notch filter N introduced in the pulse width modulator control loop P. This notch filter N is centred on the ripple frequency of a ripple voltage which occurs on the output storage capacitor C1 which forms part of the boost converter. The function of the notch filter N is to reduce the effect which the ripple voltage has on the input current waveform purity. It is to be noted that the ripple voltage is at a frequency of twice the input line frequency.

The output from the notch filter N drives a modulator M having an output to the switch S and coupled by a current transformer T to the ground line L carrying the input current.

The embodiments of the invention now to be described reduce the main loop response to output capacitor ripple voltage in a manner which is insensitive to input line frequency at the same time as allowing a rapid response to output voltage deviations beyond normal ripple voltage levels.

Figure 2:
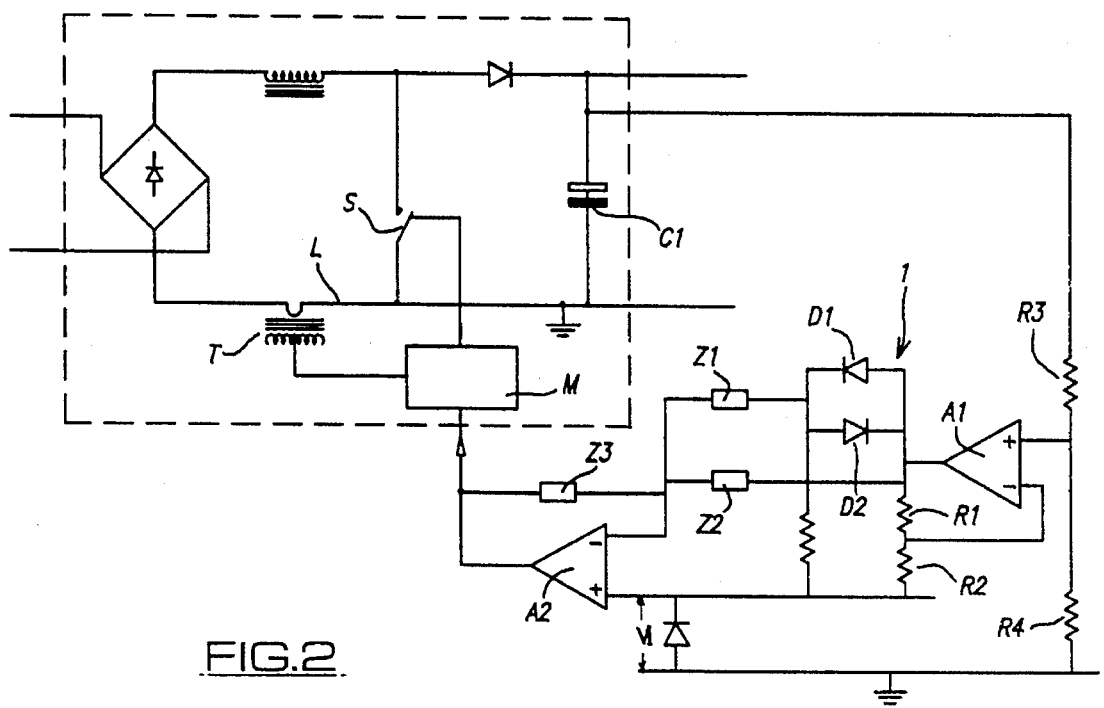
FIG. 2 shows a similar arrangement to that of FIG. 1 but modified in accordance with a first embodiment of the invention.
Figure 3:
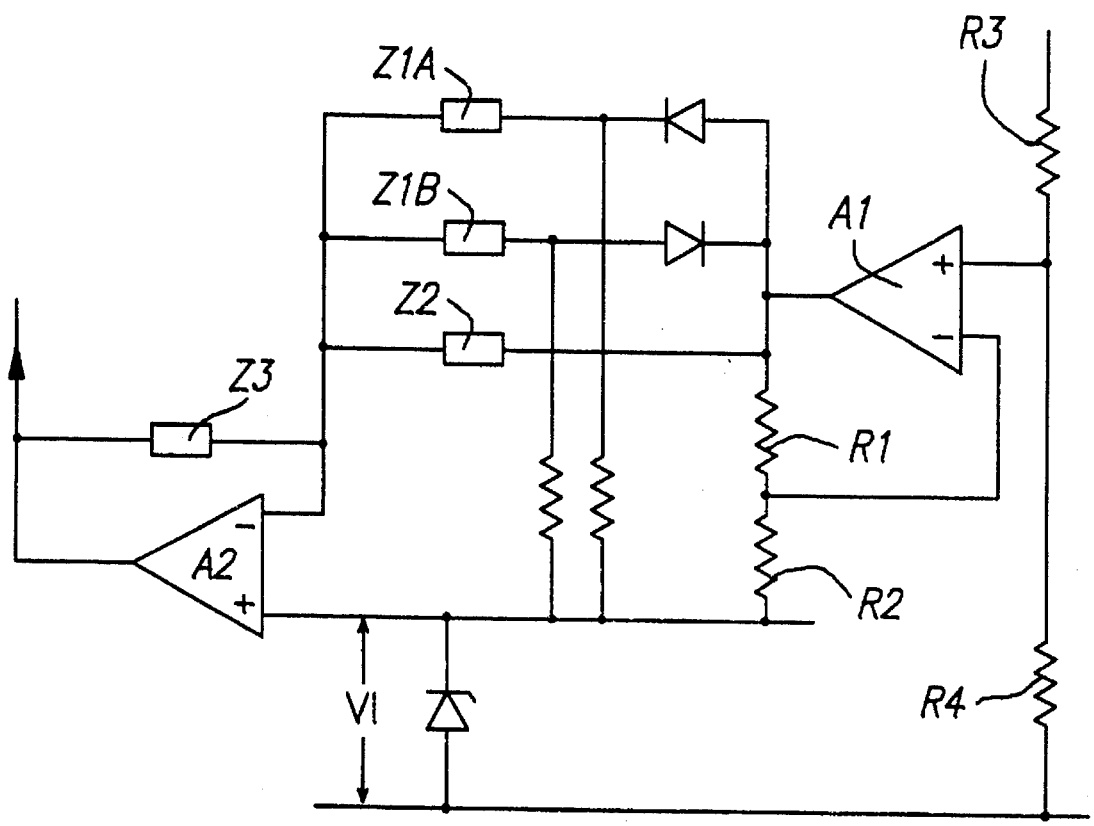
FIG. 3 shows how the feed back loop of FIG. 2 may be modified to provide a further embodiment of the invention.

Thus, referring to FIGS. 2 and 3, and firstly to FIG. 2, the modulator demand signal is derived from a voltage error sensing circuit 1 which compares a fraction (set by $R_3$ and $R_4$) of the voltage output of capacitor C1, with a reference voltage V1.

When steady state conditions prevail on C1, the normal ripple voltage on C1 does not forward bias the diodes D1 and D2 which are connected in parallel on the output of operational amplifier A1 as shown. This is achieved by R1 and R2 defining that the operational amplifier A1 will have the appropriate gain under these conditions (steady state). Also, under these conditions (neither diode D1 nor D2 conducting) impedances Z2 and Z3 are in series and are arranged to give a high attenuation to ripple voltage and hence the demand signal response is relatively slow due to changes caused by normal ripple voltage. This can be considered the first response control condition; the arrangement of the embodiment is however a dual response controller.

Thus, when the output voltage on C1 deviates beyond the normal steady state ripple voltage levels due to transient deviation, in a positive sense or a negative sense, for example during large changes in load on the boost converter output, D1 or D2 will become conductive depending upon the direction of deviation of the output voltage on C1, and impedances Z1 and Z2 operate as a parallel combination in series with Z3 so that the demand signal response depends upon the circuit comprising Z1 and Z2 in a parallel combination and Z3. These impedances are selected such that under these conditions the response will be much faster than when Z2 and Z3 act alone. These positive and negative transient responses can be the same or may be made to be different by using two impedances Z1A and Z1B as shown in FIG. 3 instead of a single impedence Z1. It will be appreciated that only sufficient of the circuit of FIG. 2 is shown in FIG. 3 to illustrate the modified arrangement.

The invention is not to be considered as limited to the application described. It can be used in any feedback control loop where the controlled signal contains an undesirable superimposed ripple but where a rapid response to transient controlled quantity changes is required.

The invention is also capable of definition in another aspect as follows:

In a power supply circuit comprising an input and an output and an operational amplifier feedback control loop for improving the quality of the input current waveform dependent upon conditions at the output, and wherein the output is susceptible to undesirable superimposed ripple in steady state conditions and transient deviations from said steady state condition;

the improvement that an operational amplifier, which is set to compare the output with a reference, acts in a dual response mode in that its output is connected to an impedance circuit and switch means switching the impedance circuit between a slow response condition and a fast response condition, and setting means which sets the amplifier such the normal ripple on the amplifier input is insufficient to cause the amplifier output to switch the impedance circuit into fast response mode but deviations of the output beyond normal ripple are.

All of the features as specified in the specification and in the claims are combinable with this aspect.

I claim:

1. In a power supply circuit comprising an input and an output, and a feedback control loop for improving the quality of the input current waveform dependent upon conditions at the output, and wherein the output is susceptible to undesireable superimposed ripple in steady state condition and transient deviations from said steady state conditions;

the improvement that in the feedback control loop there is provided an impedance circuit comprising a parallel combination of first and second impedances, and a third impedance in series with said parallel combination, and a switching means isolating the first impedance under steady state conditions so that the impedance circuit provides high attenuation to said ripple, and in transient deviations said switching means switching in the first impedance so that the impedance circuit provides a faster response than when the first impedance is isolated.

2. The improvement according to claim 1, wherein said switching means includes bi-directional switches which are respectively operated depending upon the direction of deviation of the transient from the steady state condition.

3. The improvement according to claim 2, wherein said switches comprise oppositely biased diodes.

4. The improvement according to claim 2, wherein said first impedance comprises first and second elements of different values respectively connected in series with said switches so that the response in transient deviation conditions will be different depending upon the direction of such deviations from the steady state conditions.

5. The improvement according to claim 1, wherein the output is connected to one input of an operational amplifier to the other input of which as connected for comparison a reference signal, and the output of the operational amplifier is connected to said impedence circuit.

6. The improvement according to claim 5, wherein the output is applied to the operational amplifier through a divider so that a fraction of said output is applied to the operational amplifier.

7. The improvement according to claim 5, wherein the reference signal is applied via a divider such that the normal superimposed ripple does not forward bias the diodes.

8. The improvement according to claim 1, wherein the power supply is an off line switched mode power supply.

9. The improvement according to claim 1, wherein the output comprises a storage capacitor.

10. In a power supply circuit comprising an input and an output and an operational amplifier feedback control loop for improving the quality of the input current waveform dependent upon conditions at the output, and wherein the output is susceptible to undesirable superimposed ripple in steady state conditions and transient deviations from said steady state conditions;

the improvement that an operational amplifier, which is to compare the output with reference, acts in a dual response mode in that its output is connected to an impedence circuit and including switch means switching the impedence circuit between a slow response condition and a fast response condition, and setting means which sets the amplifier such that the normal ripple on the amplifier input is insufficient to cause the amplifier output to switch the impedence circuit into fast response mode but deviations of the output beyond normal ripple are sufficient to cause the amplifier output to switch the impedence circuit into fast response mode.

11. A feedback control loop in a power supply circuit, comprising:

a first impedance;

a second impedance;

a switch operative to selectively couple the first impedance to the second impedance in a parallel combination; and a third impedance coupled in series to the second impedance;

wherein the first impedance is isolated from the second impedance by opening the switch during steady state conditions; and wherein the first impedance is coupled in parallel to the second impedance by closing the switch during transient deviations from the steady state conditions.

12. The feedback control loop of claim 11, wherein the switch comprises:

bi-directional switches which are respectively operated depending upon the direction of deviation of the transient from the steady state condition.

13. The feedback control loop of claim 12, wherein the bi-directional switches comprise oppositely biased diodes.

14. The feedback control loop of claim 12, wherein the first impedance comprises first and second elements of different values respectively connected in series with said switches so that the response in transient deviation conditions will be different depending upon the direction of such deviations from the steady state conditions.

15. The feedback control loop of claim 11, wherein the power supply circuit is an off-line switched mode power supply.

* * * * *